(12) United States Patent
Kotler et al.

(10) Patent No.: US 12,042,984 B2
(45) Date of Patent: Jul. 23, 2024

(54) HYBRID, MULTI-MATERIAL 3D PRINTING

(71) Applicant: ORBOTECH LTD., Yavne (IL)

(72) Inventors: Zvi Kotler, Tel Aviv (IL); Gil Bernstein Toker, D. N. Tzfon Yehuda (IL); Marc Altman, Rehovot (IL)

(73) Assignee: ORBOTECH LTD., Yavne (IL)

( * ) Notice: Subject to any disclaimer, the term of this patent is extended or adjusted under 35 U.S.C. 154(b) by 371 days.

(21) Appl. No.: 16/338,498

(22) PCT Filed: Oct. 31, 2017

(86) PCT No.: PCT/IL2017/051183
§ 371 (c)(1),
(2) Date: Apr. 1, 2019

(87) PCT Pub. No.: WO2018/092123
PCT Pub. Date: May 24, 2018

(65) Prior Publication Data
US 2019/0263054 A1    Aug. 29, 2019

Related U.S. Application Data

(60) Provisional application No. 62/423,215, filed on Nov. 17, 2016.

(51) Int. Cl.
*B29C 64/00* (2017.01)
*B29C 64/10* (2017.01)
(Continued)

(52) U.S. Cl.
CPC ............ *B29C 64/147* (2017.08); *B29C 64/00* (2017.08); *B29C 64/10* (2017.08); *B29C 64/176* (2017.08);
(Continued)

(58) Field of Classification Search
CPC .......................... B29C 64/147; B29C 64/223
See application file for complete search history.

(56) References Cited

U.S. PATENT DOCUMENTS 5,192,259 A   3/1993   Budolfson
5,209,878 A   3/1993   Smalley et al.
(Continued)

FOREIGN PATENT DOCUMENTS

CN    1791964 A     6/2006
CN    101185025 A   5/2008
(Continued)

OTHER PUBLICATIONS

International Application # PCT/IL2017/051183 search report dated Jan. 30, 2018.
(Continued)

*Primary Examiner* — Nicholas R Krasnow
(74) *Attorney, Agent, or Firm* — Hodgson Russ LLP

(57) ABSTRACT

A method for manufacturing includes applying patterned electromagnetic energy to each of a sequence of layers of a dry film comprising a photosensitive material so as to create in the photosensitive material in each of the layers a respective two-dimensional (2D) pattern corresponding to a slice of a predefined three-dimensional (3D) structure. The layers in the sequence in which the respective 2D pattern has been created are laminated together to produce a multi-layer stack. The multi-layer stack is developed so as to remove the photosensitive material in which the 2D pattern has not been created, thereby forming the 3D structure.

6 Claims, 9 Drawing Sheets

(51) Int. Cl.

| | | |
|---|---|---|
| *B29C 64/147* | (2017.01) | |
| *B29C 64/176* | (2017.01) | |
| *B29C 64/182* | (2017.01) | |
| *B29C 64/20* | (2017.01) | |
| *B29C 64/205* | (2017.01) | |
| *B29C 64/218* | (2017.01) | |
| *B29C 64/223* | (2017.01) | |
| *B29C 64/227* | (2017.01) | |
| *B29C 64/245* | (2017.01) | |
| *B29C 64/25* | (2017.01) | |
| *B29C 64/255* | (2017.01) | |
| *B29C 64/268* | (2017.01) | |
| *B29C 64/295* | (2017.01) | |
| *B29C 64/30* | (2017.01) | |
| *B29C 64/307* | (2017.01) | |
| *B29C 64/40* | (2017.01) | |
| *B29C 67/00* | (2017.01) | |
| *B33Y 40/00* | (2020.01) | |
| *B33Y 40/10* | (2020.01) | |
| *B33Y 40/20* | (2020.01) | |
| *B33Y 50/00* | (2015.01) | |
| *B33Y 70/00* | (2020.01) | |
| *B33Y 80/00* | (2015.01) | |
| *B33Y 99/00* | (2015.01) | |
| *B22F 10/22* | (2021.01) | |
| *B22F 12/63* | (2021.01) | |
| *B33Y 10/00* | (2015.01) | |
| *B33Y 30/00* | (2015.01) | |

(52) U.S. Cl.
CPC ............ *B29C 64/182* (2017.08); *B29C 64/20* (2017.08); *B29C 64/205* (2017.08); *B29C 64/218* (2017.08); *B29C 64/223* (2017.08); *B29C 64/227* (2017.08); *B29C 64/245* (2017.08); *B29C 64/25* (2017.08); *B29C 64/255* (2017.08); *B29C 64/268* (2017.08); *B29C 64/295* (2017.08); *B29C 64/30* (2017.08); *B29C 64/307* (2017.08); *B29C 64/40* (2017.08); *B29C 67/00* (2013.01); *B33Y 40/00* (2014.12); *B33Y 40/10* (2020.01); *B33Y 40/20* (2020.01); *B33Y 50/00* (2014.12); *B33Y 70/00* (2014.12); *B33Y 80/00* (2014.12); *B33Y 99/00* (2014.12); *B22F 10/22* (2021.01); *B22F 12/63* (2021.01); *B22F 2999/00* (2013.01); *B33Y 10/00* (2014.12); *B33Y 30/00* (2014.12); *Y02P 10/25* (2015.11)

(56) References Cited

U.S. PATENT DOCUMENTS

| | | | |
|---|---|---|---|
| 6,283,997 B1 | 9/2001 | Garg et al. | |
| 6,521,489 B2 | 2/2003 | Duthaler et al. | |
| 6,649,861 B2 | 11/2003 | Duignan | |
| 7,184,194 B2* | 2/2007 | Wood | G09G 3/346 |
| | | | 348/E5.142 |
| 7,259,106 B2 | 8/2007 | Jain | |
| 7,277,770 B2 | 10/2007 | Huang | |
| 7,353,598 B2 | 4/2008 | Craig et al. | |
| 7,508,515 B2 | 3/2009 | Hanina et al. | |
| 7,682,970 B2 | 3/2010 | Grigoropoulos et al. | |
| 7,795,125 B2 | 9/2010 | Buretea et al. | |
| 8,056,222 B2 | 11/2011 | Pique et al. | |
| 8,227,908 B2 | 7/2012 | Otremba et al. | |
| 8,594,825 B2 | 11/2013 | Wahlsten et al. | |
| 8,603,308 B2 | 12/2013 | Bhullar et al. | |
| 8,879,957 B2 | 11/2014 | Hanson et al. | |
| 8,895,406 B2 | 11/2014 | Rogers et al. | |
| 9,349,900 B2 | 5/2016 | Rogers et al. | |
| 9,446,618 B2 | 9/2016 | Batt | |
| 9,533,451 B2 | 1/2017 | Folgar et al. | |
| 2002/0118375 A1* | 8/2002 | Ramanujan | B41J 2/465 |
| | | | 358/1.2 |
| 2006/0237880 A1 | 10/2006 | Wicker et al. | |
| 2007/0209029 A1* | 9/2007 | Ivonin | G03F 7/70308 |
| | | | 430/311 |
| 2007/0260349 A1* | 11/2007 | John | B29C 71/04 |
| | | | 700/118 |
| 2008/0135282 A1 | 6/2008 | Jonnalagadda et al. | |
| 2008/0145639 A1 | 6/2008 | Sun et al. | |
| 2012/0299186 A1 | 11/2012 | White et al. | |
| 2014/0238592 A1 | 8/2014 | Marinov et al. | |
| 2015/0059968 A1 | 3/2015 | Shinoda et al. | |
| 2015/0251351 A1* | 9/2015 | Feygin | B29C 64/141 |
| | | | 156/267 |
| 2015/0382476 A1 | 12/2015 | Zenou et al. | |
| 2016/0198576 A1 | 7/2016 | Lewis et al. | |
| 2016/0233089 A1 | 8/2016 | Zenou et al. | |
| 2016/0313641 A1 | 10/2016 | De et al. | |
| 2017/0043603 A1* | 2/2017 | Batt | B41M 5/40 |
| 2017/0297288 A1* | 10/2017 | Winters | G03G 15/1625 |

FOREIGN PATENT DOCUMENTS

| | | | |
|---|---|---|---|
| CN | 104137270 A | | 11/2014 |
| CN | 104461188 A | | 3/2015 |
| CN | 105365223 A | | 3/2016 |
| CN | 105408095 A | | 3/2016 |
| CN | 105409335 A | | 3/2016 |
| CN | 105563830 A | | 5/2016 |
| CN | 105690753 A | | 6/2016 |
| CN | 105690753 A | * | 6/2016 |
| EP | 2469990 A2 | | 6/2012 |
| JP | H08127073 A | | 5/1996 |
| JP | 2015116710 A | | 6/2015 |
| WO | 2014209994 A2 | | 12/2014 |
| WO | 2015181810 A1 | | 12/2015 |
| WO | 2016020817 A1 | | 2/2016 |
| WO | 2016146374 A1 | | 9/2016 |

OTHER PUBLICATIONS

DuPont Electronic Technologies, "DuPont MX5000 Series", Data sheet and processing information, pp. 1-5, Jul. 17, 2006.
European Application # 17872862.2 Search Report dated Jun. 16, 2020.
EPO, European Search Report and Opinion for EP Application No. 17872862.2, Sep. 28, 2020.
EPO, Communication from the Examining Division for EP Application No. 17872862.2, Jul. 27, 2022.
CNIPA, First Office Action for CN Application No. 201780070420.9, Oct. 14, 2020.
CNIPA, Second Office Action for CN Application No. 201780070420.9, May 7, 2021.

\* cited by examiner

HYBRID, MULTI-MATERIAL 3D PRINTING

CROSS-REFERENCE TO RELATED APPLICATION

This application claims the benefit of U.S. Provisional Patent Application 62/423,215, filed Nov. 17, 2016, which is incorporated herein by reference.

FIELD OF THE INVENTION

The present invention relates to methods and systems for fabrication of functional devices by three-dimensional (3D) printing.

BACKGROUND

In 3D printing, processes (also referred to as additive manufacturing), 3D objects are created by building up successive layers of material under computer control to create an object. Objects of almost any shape and geometry can be produced in this manner from digital model data.

Some 3D printing techniques support the incorporation of functional elements, such as electronic components, into a 3D structure. For example, PCT International Publication WO 2014/209994 describes a printed 3D functional part, which includes a 3D structure comprising a structural material, and at least one functional electronic device at least partially embedded in the 3D structure. The functional electronic device has a base secured against an interior surface of the 3D structure. One or more conductive filaments are at least partially embedded in the 3D structure and electrically connected to the at least one functional electronic device.

Some 3D printing techniques involve lamination of multiple, successive solid layers to produce a 3D structure. For example, U.S. Pat. No. 8,879,957 describes an additive manufacturing system for printing a 3D part using electrophotography. The system comprises a rotatable photoconductor component, first and second development stations configured to develop layers of materials on a surface of the rotatable photoconductor component while the rotatable photoconductor component rotates in opposing rotational directions, and a platen configured to operably receive the developed layers in a layer-by-layer manner to print the 3D part from at least a portion of the received layers.

As another example, U.S. Patent Application Publication 2015/0251351 describes an apparatus and method of manufacture for an integral 3D object formed from individually contoured laminations (layers) produced from thin sheet materials that are stabilized on a removable carrier and formed both along and across the sheet material prior to stacking the contoured laminations in precise registration to one another. The waste material surrounding the laminations and the carrier is separated from the desired object. The process of forming the contoured laminations, separating the waste material, bonding, and stacking is continued until the construction of the desired 3D object is complete.

SUMMARY

Embodiments of the present invention that are described hereinbelow provide improved methods and systems for 3D printing, as well as novel types of devices produced by such methods.

There is therefore provided, in accordance with an embodiment of the invention, a method for manufacturing, which includes applying patterned electromagnetic energy to each of a sequence of layers of a dry film including a photosensitive material so as to create in the photosensitive material in each of the layers a respective two-dimensional (2D) pattern corresponding to a slice of a predefined three-dimensional (3D) structure. The layers in the sequence in which the respective 2D pattern has been created are laminated together to produce a multi-layer stack. The multi-layer stack is developed so as to remove the photosensitive material in which the 2D pattern has not been created, thereby forming the 3D structure.

In some embodiments, the method includes pre-forming a cavity in at least one layer, wherein laminating together the layers includes inserting the at least one layer in the stack together with the layers in which the respective pattern has been created. A functional component may be inserted in the cavity. In one embodiment, laser-induced forward transfer (LIFT) is applied to eject droplets of an adhesive into the cavity prior to inserting the functional component. Additionally or alternatively, the at least one layer includes a first material, and wherein the method includes filling the cavity with a second material, different from the first material.

Additionally or alternatively, the method includes forming a conductive structure in or on at least one of the layers in the sequence before laminating the layers together. In some embodiments, forming the conductive structure includes applying laser-induced forward transfer (LIFT) to eject droplets of a metal onto a predefined area of the treated layer. In a disclosed embodiment, forming the conductive structure includes treating the at least one of the layers to enhance adhesion of the metal to the dry film prior to applying LIFT to eject the droplets. Treating the at least one of the layers may include treating only the predefined area onto which the droplets are to be ejected.

In a disclosed embodiment, the method includes embedding a functional component in at least one of the layers in the sequence before laminating the layers together. Additionally or alternatively, the layers in the sequence include at least first and second layers of different, respective first and second compositions. Further additionally or alternatively, the layers in the sequence include at least first and second layers of different, respective first and second thicknesses.

In some embodiments, applying the patterned electromagnetic energy includes applying the electromagnetic energy to selected target locations in each layer among at least some of the layers in the sequence with an energy flux at least twice a threshold flux that is needed to expose the photosensitive material through an entire thickness of the layer. The electromagnetic energy can be applied by irradiating the layer with the electromagnetic energy at a plurality of overlapping spots in the layer. In a disclosed embodiment, applying the patterned electromagnetic energy includes modulating the electromagnetic energy using a spatial light modulator having a given resolution, and irradiating the layer includes applying a shift between the spatial light modulator and the layer that is finer than the given resolution in order to create the overlapping spots.

There is also provided, in accordance with an embodiment of the invention, a method for manufacturing, which includes applying patterned electromagnetic energy to a dry film including a photosensitive material so as to create in the photosensitive material in the dry film in a two-dimensional (2D) pattern defining closed and open areas to be formed in the dry film upon development of the photosensitive material. A metal trace is printed on the dry film in which the 2D pattern has been created such that the metal trace crosses the open area. The dry film is developed after printing the metal trace so as to remove the photosensitive material in which the 2D pattern has not been created, whereupon the metal trace extends over the open area.

In one embodiment, the metal trace forms a bridge over the open area. Additionally or alternatively, the metal trace forms a cantilever over the open area.

In a disclosed embodiment the dry film is laminated into a stack of layers so as to produce a predefined three-dimensional (3D) structure that incorporates the metal trace. Typically, the dry film is laminated into the stack of the layers before developing the dry film.

Additionally or alternatively, the method includes, before developing the dry film, heating the dry film and applying pressure on the printed metal trace so as to embed the metal trace into the dry film.

There is additionally provided, in accordance with an embodiment of the invention, a method for manufacturing, which includes applying patterned electromagnetic energy to each of a sequence of layers, including at least first and second layers, of a dry film including a photosensitive material so as to create in the photosensitive material in each of the layers a respective two-dimensional (2D) pattern corresponding to a slice of a predefined three-dimensional (3D) structure. After creating the respective 2D pattern in the first layer, a metal trace is printed on the dry film of the first layer. The first layer and pressure is applied on the printed metal trace so as to embed the metal trace into the dry film of the first layer. After embedding the metal trace, at least the second layer is laminated over the first layer so to produce a multi-layer stack containing the metal trace. The multi-layer stack is developed so as to remove the photosensitive material in which the 2D pattern has not been created, thereby forming the 3D structure.

In one embodiment, the method includes embedding a functional component in at least one of the layers, wherein printing the metal trace includes forming the metal trace so as to make electrical contact with the functional component.

In a disclosed embodiment, heating the first layer includes heating at least the first layer to a temperature in the range of 50-90° C., and applying the pressure includes applying no more than 3 bars of pressure to the metal trace.

There is further provided, in accordance with an embodiment of the invention, a method for manufacturing, which includes printing on a first layer conductive interconnects including one or more conical pillars extending away from a surface of the first layer. Patterned electromagnetic energy applied to at least a second layer including a dry film of a photosensitive material, so as to create in the photosensitive material a two-dimensional (2D) pattern corresponding to a slice of a predefined three-dimensional (3D) structure. After creating the 2D pattern in the second layer, heat and pressure are applied to the second layer so as to laminate the second layer to the first layer such that after lamination, the one or more conical pillars protrude through the second layer. After laminating the second layer, an electrical connection is made to the one or more conical pillars that protrude through the second layer.

In a disclosed embodiment, a functional component is embedded in the first layer, wherein printing the conductive interconnects includes making an electrical contact between the functional component and at least one of the pillars.

In a disclosed embodiment, the one or more conical pillars have respective bases in contact with the first layer and respective top ends that protrude through the second layer, wherein the bases have respective base diameters and the top ends have respective top-end diameters such that the base diameters are at least twice the top-end diameters.

There is moreover provided, in accordance with an embodiment of the invention, a method for manufacturing, which includes specifying for a planar dielectric layer a mechanical property that varies over an area of the dielectric layer. A metal pattern is printed on the dielectric layer, wherein the metal pattern has a dimension that varies over the area of the dielectric layer in accordance with the specified mechanical property.

In one embodiment, the specified mechanical property is a measure of stiffness, which varies of the area of the dielectric layer due to a variation in a transverse dimension of one or more traces in the metal pattern.

In a disclosed embodiment, the method includes laminating the dielectric layer into a multi-layer stack, so as to form a three-dimensional (3D) structure containing the dielectric layer with the specified mechanical property.

There is moreover provided, in accordance with an embodiment of the invention, a system for manufacturing, including a patterning assembly, which is configured to apply patterned electromagnetic energy to each of a sequence of layers of a dry film including a photosensitive material so as to create in the photosensitive material in each of the layers a respective two-dimensional (2D) pattern corresponding to a slice of a predefined three-dimensional (3D) structure. A lamination assembly is configured to laminate together the layers in the sequence in which the respective 2D pattern has been created to produce a multi-layer stack. A development terminal is configured to develop the multi-layer stack so as to remove the photosensitive material in which the 2D pattern has not been created, thereby forming the 3D structure.

There is furthermore provided, in accordance with an embodiment of the invention, a system for manufacturing, including a patterning assembly, which is configured to apply patterned electromagnetic energy to a dry film including a photosensitive material so as to create in the photosensitive material in the dry film in a two-dimensional (2D) pattern defining closed and open areas to be formed in the dry film upon development of the photosensitive material. A printing sub-system is configured to print a metal trace on the dry film in which the 2D pattern has been created such that the metal trace crosses the open area. A development terminal is configured to develop the dry film after printing the metal trace so as to remove the photosensitive material in which the 2D pattern has not been created, whereupon the metal trace extends over the open area.

There is also provided, in accordance with an embodiment of the invention, a system for manufacturing, including a patterning assembly, which is configured to apply patterned electromagnetic energy to each of a sequence of layers, including at least first and second layers, of a dry film including a photosensitive material so as to create in the photosensitive material in each of the layers a respective two-dimensional (2D) pattern corresponding to a slice of a predefined three-dimensional (3D) structure. A printing sub-system is configured to print a metal trace on the dry film of the first layer after creation of the respective 2D pattern in the first layer. An embedding module is configured to heat the first layer and applying pressure on the printed metal trace so as to embed the metal trace into the dry film of the first layer. A lamination assembly is configured to laminate at least the second layer over the first layer after embedding the metal trace so to produce a multi-layer stack containing the metal trace. A development terminal is configured to develop the multi-layer stack so as to remove the photosensitive material in which the 2D pattern has not been created, thereby forming the 3D structure.

There is additionally provided, in accordance with an embodiment of the invention, a system for manufacturing, including a printing sub-system, which is configured to print on a first layer conductive interconnects including one or more conical pillars extending away from a surface of the first layer. A patterning assembly is configured to apply patterned electromagnetic energy to at least a second layer including a dry film of a photosensitive material, so as to create in the photosensitive material a two-dimensional (2D) pattern corresponding to a slice of a predefined three-dimensional (3D) structure. A lamination assembly is configured to heat and apply pressure over the second layer after creating the 2D pattern in the second layer, so as to laminate the second layer to the first layer such that after lamination, the one or more conical pillars protrude through the second layer. The printing sub-system is configured to form an electrical connection to the one or more conical pillars that protrude through the second layer after laminating the second layer.

There is further provided, in accordance with an embodiment of the invention, a system for manufacturing, including a printing sub-system, which is configured to print on a dielectric layer a metal pattern having a dimension that varies over an area of the dielectric layer in accordance with a mechanical property that is specified to vary over the area of the dielectric layer. A lamination assembly is configured to laminate the dielectric layer into a multi-layer stack, so as to form a three-dimensional (3D) structure containing the dielectric layer with the specified mechanical property.

The present invention will be more fully understood from the following detailed description of the embodiments thereof, taken together with the drawings in which:

DETAILED DESCRIPTION OF EMBODIMENTS

Overview

Figure 1:
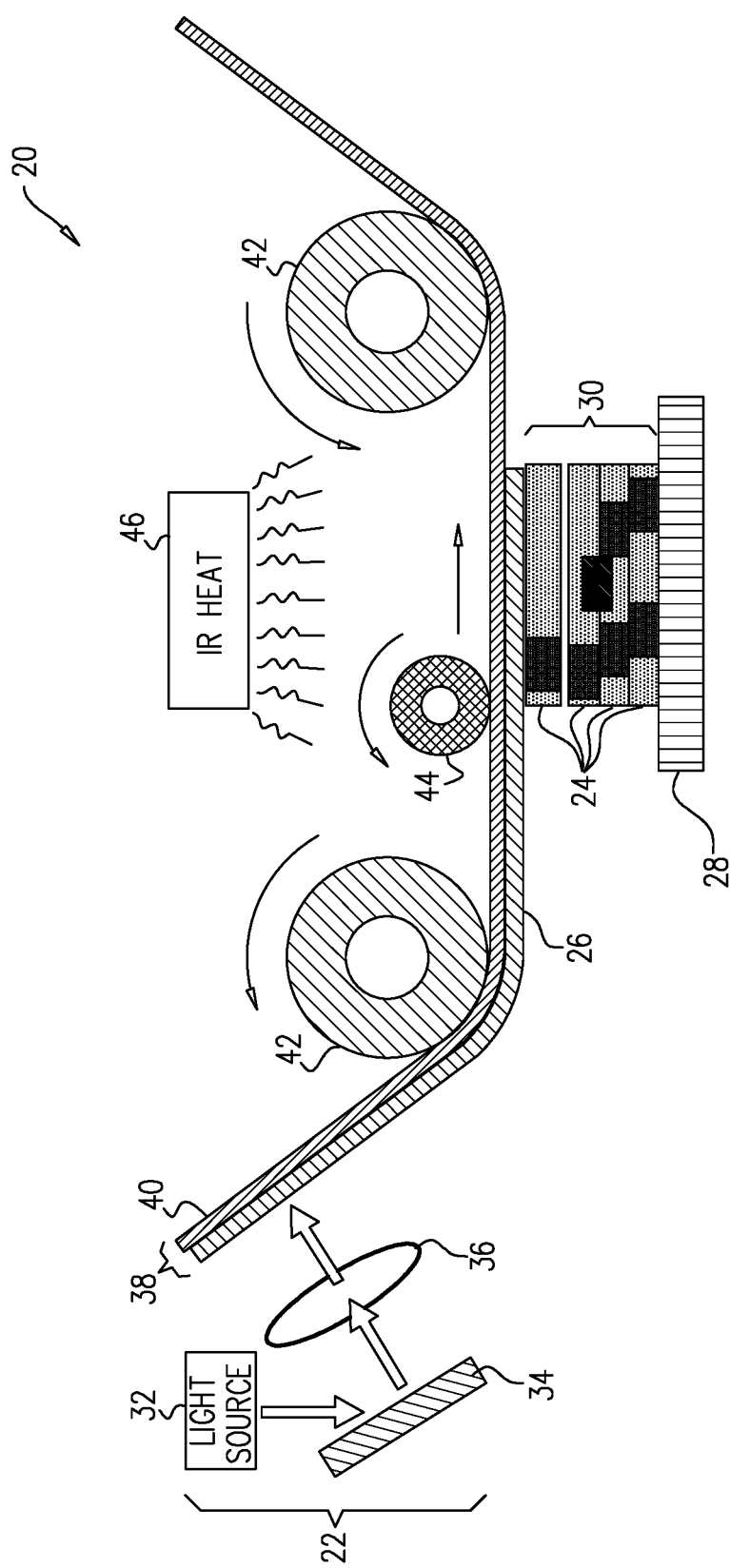
FIG. 1 is a schematic side view of a patterning and lamination station, in accordance with an embodiment of the invention.

Most commercially-available 3D printing systems use liquid-phase materials to build up 3D structures layer-by-layer. Although these techniques offer great versatility in the shapes of the structures that they can produce, they are limited by the printing process itself in the types of materials that they can use and in the possibilities of creating functional structures by combining different materials and embedded components. Laminated structures made by stacking pre-formed solid two-dimensional (2D) layers overcome some of these limitations, but in systems that are known in the art, these benefits come at the expense of more complicated and less flexible manufacturing processes.

Embodiments of the present invention that are described herein offer novel techniques and systems for flexible fabrication of 3D structures. They enable the production of 3D structures with both high precision and high throughput, including structures made from multiple different materials. The disclosed techniques are especially (though not exclusively) useful in producing functional structures, i.e., structures having particular mechanical, thermal and electrical properties, based on combinations of materials and possibly embedded components. They can be used, for example, in producing a wide range of integrated electrical and micromechanical devices.

Some of the disclosed embodiments make use of photosensitive dry films (PS-DF), in contrast to the photosensitive liquids that are used in most 3D printing systems that are known in the art. Three-dimensional structures are created from stacks of patterned PS-DF layers, each corresponding to a 2D slice of the target 3D structure. The appropriate 2D pattern is created in each layer in sequence by applying patterned electromagnetic energy to the layer. At this stage, a latent image of the 2D pattern is exposed in the layer, but is not yet developed, i.e., the PS-DF still contains both exposed and unexposed material in different areas of the layer (although in some cases, pre-formed layers may be inserted in the stack, as described further hereinbelow). The layers in which the respective 2D patterns have been created are stacked together in sequence. The resulting multi-layer stack is then developed so as to remove the photosensitive material in which the 2D pattern has not been created, thus forming the 3D structure.

In some of the disclosed embodiments, traces of metal, and possibly printed traces of other sorts of functional materials, are integrated with patterned layers of PS-DF.

Laser-induced forward transfer (LIFT) is particularly well suited for integration with the 3D fabrication techniques that are described herein, but other processes that are known in the art for printing metal structures can alternatively be used. For example, in one embodiment, a metal trace is printed on a PS-DF layer after a 2D pattern has been created, but not yet developed, such that the metal trace crosses an open area in the pattern. The dry film is developed after printing the metal trace so as to remove the photosensitive material in which the 2D pattern was not created, whereupon the metal trace forms a bridge over the open area.

As another example, after creating a 2D pattern in a PS-DF layer (but again, before development), and printing of a trace (such as a metal trace) on the dry film of the layer, heat and pressure may be applied over the printed metal trace so as to embed the trace into the dry film of the layer. Lamination of other 2D layers over the trace, followed by development of the 3D structure, proceeds as described above.

Metal printing, by LIFT or another suitable process, may also be applied to create conductive pillars that extend through adjacent layers of the structure. In one embodiment, conical pillars are printed on an underlying layer, and a PS-DF layer is then laminated over the underlying layer while applying heat and pressure such that after lamination, the tops of the hard conical pillars protrude through the softer PS-DF layer. The tops of the pillars can be used, for example, in making electrical connections to traces in the underlying layers.

The sorts of multi-modal printing techniques that are described herein are particularly well suited for making functional 3D structures, for example, structures include moving parts, as well as electrical, optical and/or magnetic components and circuit elements, which may be used in controlling the structures. Such structures can include layers of different thicknesses, made of the same or different materials, with different mechanical properties. The resulting structures can be particularly useful, for example, in micro-electro-mechanical systems (MEMS), small-scale medical devices, and micro-scale porous metal structures.

In the sections that follow in the present disclosure, a variety of different techniques are described for use in manufacturing of 3D structures. For the sake of clarity and convenience, implementation of these techniques is described below in the context of a certain integrated system for 3D manufacturing. Although the techniques can advantageously be used together in this manner, however, each of these techniques can also be used on its own or in combination with other methods of manufacturing that are known in the art. All such implementations are considered to be within the scope of the present invention.

System Description

FIG. 1 is a schematic side view of a patterning and lamination station 20, in accordance with an embodiment of the invention. Station 20 comprises an optical patterning assembly 22, which applies patterned electromagnetic energy to create a respective 2D pattern in each of a sequence of layers 24 made from a dry film 26 comprising a photosensitive material (referred to alternatively as a photosensitive dry film, or PS-DF). Each respective 2D pattern corresponds to a slice of a predefined 3D structure. Layers 24 are laminated together in sequence on a carrier stage 28 to produce a multi-layer stack 30. Multi-layer stack 30 is then developed (typically in a separate development station, as described below) so as to remove the photosensitive material in which the 2D patterns have not been created, thus forming the desired 3D structure.

Optical patterning assembly 22 comprises a suitable radiation source 32, such as an ultraviolet (UV) laser or incoherent source operating in the near-UV range. For example an array of laser diodes or light-emitting diodes (LEDs) operating in the range between 360 and 405 nm can be used for this purpose. Alternatively, other sorts of coherent and incoherent sources can be used, as are known in the art, depending upon the spectral sensitivity of film 26. A spatial light modulator 34, such as a digital micro-mirror devices (DMD), imposes a spatial pattern on the beam emitted from source 32 corresponding to the 2D pattern that is to be created in the current layer of film 26. Assembly 22 may be based, for example, on an off-the-shelf device, such as the DLP9500UV DMD offered by Texas Instruments (Dallas, Tex.). The DMD may be integrated in a DLP® module, such as modules supplied by EKB Technologies Ltd. (Bat-Yam, Israel), which includes a radiation source and DMD. Focusing optics 36 image the patterned radiation onto film 26 in order to expose the pattern in the film.

Alternatively, other sorts of modulators that are known in the art may be used to expose the desired pattern in film 26, including both dynamic and static modulators (such as photolithographic masks), in both reflective and transmissive modes of operation. For example, in an alternative embodiment, patterning assembly 22 may scan a laser beam over film 26, while modulating the beam to create the pattern. Assembly 22 may be positioned to irradiate film 26 from the front side, as shown in FIG. 1, or from the reverse side (assuming a carrier 40 on which the film is mounted to be sufficiently transparent to the wavelength range of radiation source 32). Other sorts of radiation sources, in the UV as well as other wavelength ranges, can alternatively be used, depending on the properties of film 26.

In the pictured example, film 26 is supplied as a roll of a prepackaged polymer film material 38, in which film 26 is mounted on carrier 40, which is removed after exposure and lamination of each layer 24. For example, material 38 may comprise a roll of MX5000™ polymer film, supplied by DuPont Electronic Technologies (Research Triangle Park, N.C.). As alternative examples, material 38 may comprise dry-film resists such as the DF-2025, DF-3025 or DF-3525 negative photoresists offered by Engineered Materials Systems, Inc. (Delaware, Ohio), or SUEX or ADEX thin dry films offered by DJ MicroLaminates, Inc. (Sudbury Mass.). Such materials comprise a microlithographic dry photoresist polymer, covered on one side by a polyethylene cover layer and on the other by a polyester carrier foil. Film 26 may comprise either a negative or a positive photoresist, meaning that patterning assembly 22 may expose either the area of the 2D pattern that is to remain in the 3D structure after development of stack 30, or the area surrounding the 2D pattern, so that the exposed material is removed in the process of development.

As an initial step (not shown in the figures), the cover layer of film 26 is stripped off, and film 26 is exposed by patterning assembly 22. A conveyor, comprising rollers 42, for example, guides the exposed film, still mounted on carrier 40, onto stack 30. Once patterned film 26 is in position, a lamination assembly, comprising a hot roller 44 in the present example, exerts heat and pressure on film 26 in order to laminate the film onto the previous layers 24 in stack 30 and separate film 26 from carrier 40. Typically, roller scans across carrier 40 at a speed in the range of 20-50 mm/sec. Following lamination, film 26 is cut to size (while the remaining carrier 40 is rolled off, as shown in FIG. 1). Stack 30 is then ready to accept the next layer.

Additionally or alternatively, the lamination assembly may comprise an external heat source, such as an infrared lamp 46, which heats film 26, as well as underlying layer 24. In this case, roller 44 need not itself be heated. The intensity and pulse duration of the radiation emitted by lamp 46 may be controlled in order to heat film 26 to an optimal temperature just prior to scanning by roller 44.

Although the example described above assumes that film material 38 is supplied and handled as a roll, in an alternative embodiment (not shown in the figures), patterning and lamination station 20 may use sheets of PS-DF material. Each successive sheet is exposed to create the desired pattern, and is then aligned with the underlying layers 24 and laminated onto stack 30. In one embodiment, in order to facilitate accurate alignment of successive layers 24, patterning assembly 22 irradiates the successive sheets of PS-DF material in a location directly above stack 30. A mechanical shutter can be interposed between the sheet that is currently being exposed and the stack below it in order to prevent overexposure of the underlying layers. This sort of scheme is described in greater detail in the above-mentioned provisional patent application. An external heat source, such as infrared lamp 46, may similarly be integrated into this lamination scheme.

The Z-resolution (resolution in the vertical direction) of the pattern created in stack 30 depends upon the thickness of film 26, while the lateral resolution (X-Y) depends upon the optical resolution of patterning assembly 22. Assuming SLM 34 to comprise a DMD with a pitch of 10-20 µm and optics 36 to have unity magnification, the pattern resolution will likewise be on the order of 10-20 µm. Finer or coarser resolution can be achieved by modifying the optical design of assembly 22 and the thickness of film 26.

The amount of time needed to expose the pattern in each layer of film 26 depends on the properties and thickness of the film (which may vary among layers 24) and the intensity and wavelength of radiation source 32. Typically, exposure takes on the order of 1 sec per layer. One advantage of the use of PS-DF in station 20 is that there is no risk of overexposure: Since each layer is exposed individually, excess exposure will have no effect on underlying layers (in contrast to methods of 3D printing using liquid-phase photopolymers, for example).

Since the 2D patterns formed in film 26 are binary, it can therefore be advantageous to overexpose the pattern in the film. For example, optical assembly 22 may apply energy from radiation source 32 to selected target locations in film 26 in at least some layers with an energy flux that is at least twice the threshold flux that is needed to expose the photosensitive material through the entire thickness of the layer. This sort of overexposure in overlapping areas of film 26 can be used in enhancing the resolution of printing the pattern, as is described further hereinbelow with reference to FIGS. 4A-4C. Although there is no strict upper limit on the flux used in overexposing the photosensitive material, extreme overexposure should be avoided in order to prevent degradation of pattern resolution, which can result, for example, from exposure of the photosensitive material by diffraction fringes around the edges of the pattern in station 20.

Figure 2:
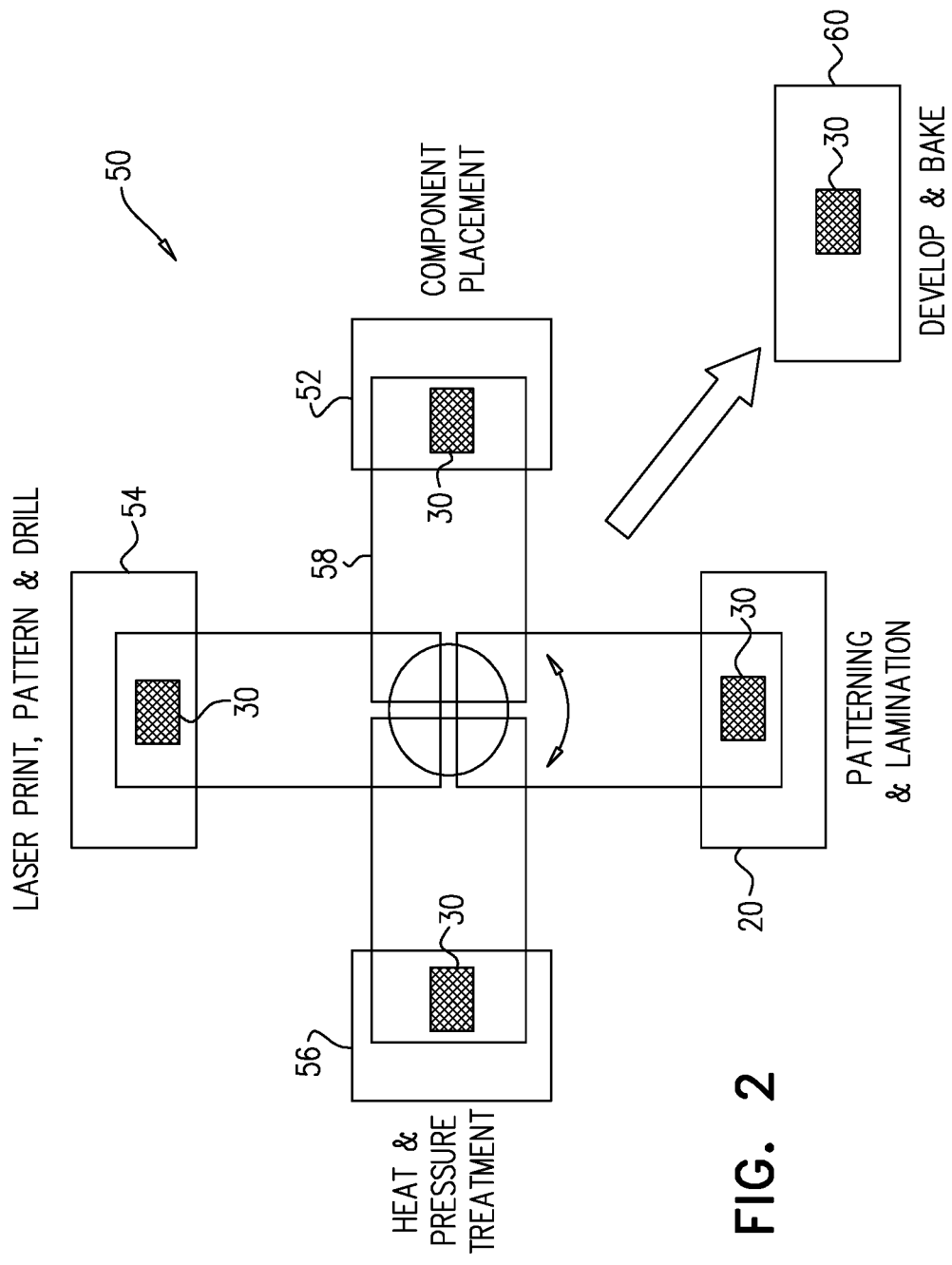
FIG. 2 block diagram that schematically illustrates a system for fabrication of 3D structures, in accordance with an embodiment of the invention.
Figure 3:
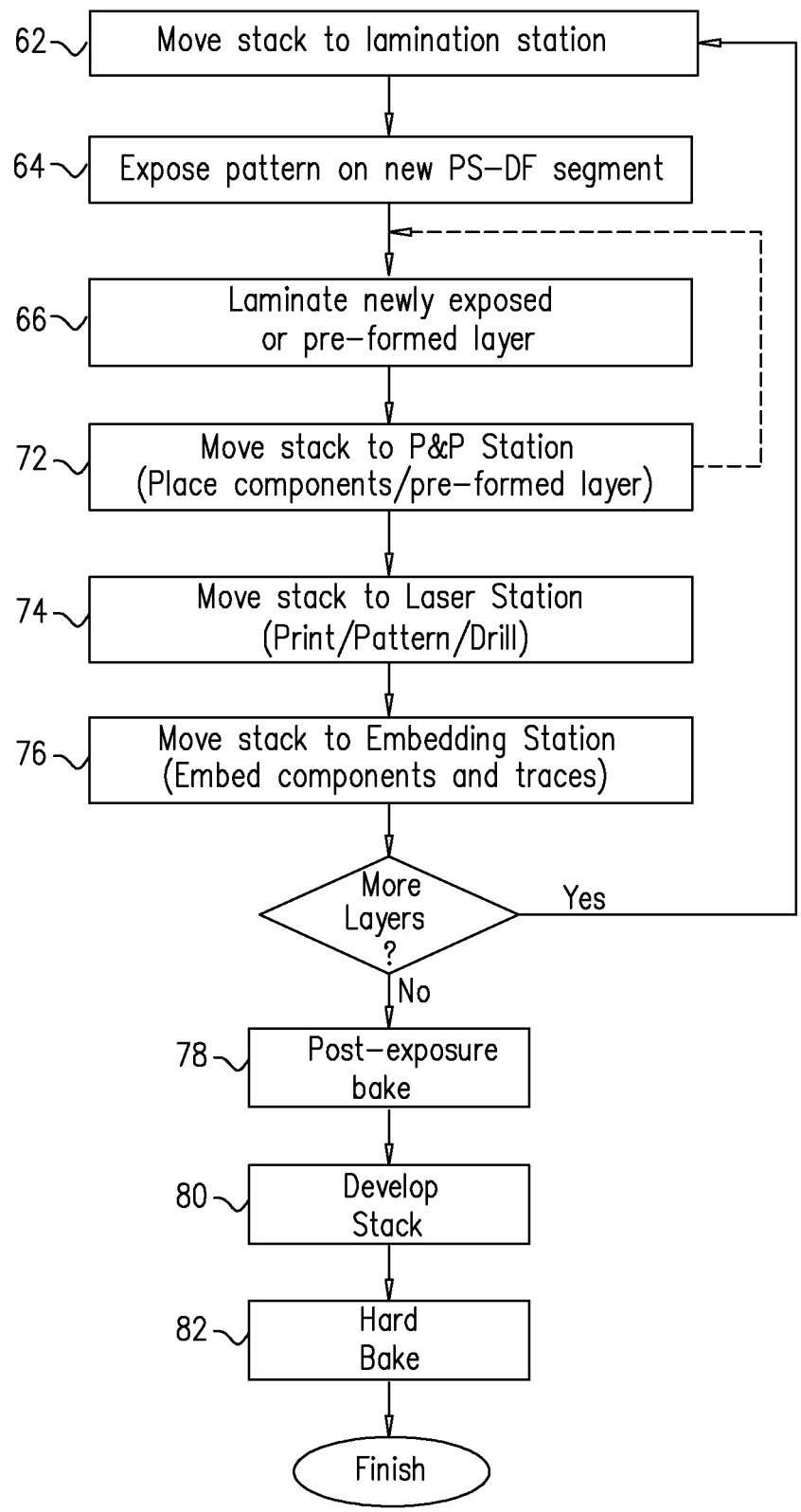
FIG. 3 is a flow chart that schematically illustrates a method for fabrication of 3D structures, in accordance with an embodiment of the invention.

Reference is now made to FIGS. 2 and 3, which schematically illustrate a system 50 and method for fabrication of 3D structures, in accordance with an embodiment of the invention. FIG. 2 is a block diagram of the system, while FIG. 3 is a flow chart illustrating the method. Although the figures illustrate a particular system and process configuration, with specific stations and steps built around patterning and lamination station 20, as described above, certain elements and features of the disclosed methods may be implemented in other system configurations, and the steps may be carried out in a different order. Some aspects of the disclosed methods may also be used independently of the PS-DF printing and lamination techniques that are described above. Thus, although all of these elements, features and aspects are described hereinbelow, for the sake of concreteness and clarity, in the context of system 50, their applications outside this context are also considered to be within the scope of the present invention.

In the pictured embodiment, system 50 includes the following stations:

Patterning and lamination station 20, as described above.

A component placement unit 52, which places active and passive components in position on or within recesses in laminated layers 24. Unit 52 can comprise a pick-and-place robot, as is known in the art of electronic fabrication, which places components such as semiconductor dies, batteries, magnets, and passive circuit components in accordance with an applicable 3D design and fabrication program. Unit 52 may also be used in positioning pre-formed layers, as described above, onto the existing stack of laminated layers 24. (Placement unit 52 is typically equipped with imaging capabilities, which can be used in registering the pre-formed layers with the previous layers.)

A printing sub-system 54, which performs functions such as laser printing, patterning and drilling. This station prints traces on layers 24, typically using LIFT techniques, although other printing technologies (for example, inkjet printing) may alternatively or additionally be applied. Suitable LIFT techniques that can be adapted for use in printing sub-system 54 are described, for example, in PCT International Publications WO 2015/181810 and WO 2016/020817, whose disclosures are incorporated herein by reference. Printing sub-system 54 may print not only metals, but also other materials such as adhesives, solder pastes, and other polymers and dielectrics, including even biological materials. The same laser as is used in the LIFT process, or possibly a different laser or mechanical component, may also be used for controlled removal of material, for example drilling, ablation of residues, and other surface treatments of layers 24.

An embedding module 56, which is used to embed printed structures, such as printed metal lines and pillars, into layers 24 by application of heat and pressure. Details of the operation of module 56 are described hereinbelow with reference to FIGS. 6A/B.

A handling subsystem 58 transfers stack 30 among station 20, unit 52, printing sub-system 54 and module 56, thus building up the components of stack 30 layer by layer, until the complete 3D design has been fabricated. Handling subsystem 58 then passes the full stack to a development and baking terminal 60, where the product is finished.

Turning now to FIG. 3, to begin processing of a new layer 24, handling subsystem 58 transfers stack 30 to patterning and lamination station 20, at a lamination initiation step 62. The layer at this stage is typically produced by exposing a dry film 26, as described above; but alternatively, some layers mad be pre-treated, with a 2D pattern of cavities already made in the desired locations. As noted earlier, it is not necessary that all of layers 24 be uniform in composition and thickness. Rather, depending on the requirements of the 3D design, certain layers can be of different compositions and/or different thicknesses from others.

In most cases, following step 62, optical patterning assembly 22 exposes the 2D pattern of the current layer in film 26, at a pattern exposure step 64, in the manner described above with reference to FIG. 1. This new layer 24 is then laminated over the existing stack, at a PS-DF lamination step 66, again as described above. Step 66 is also used in laminating pre-formed layers onto the existing stack.

It is important in step 66 that the 2D pattern in each new layer be accurately registered with the patterns in the underlying layers. When successive layers are exposed and overlaid in station 20, proper registration can be achieved by precise transfer and positioning of material 38 by rollers 42 (or by the sheet-to-sheet mechanism that was also described above). When stack 30 has been transferred at step 62 from another station in system 50, however, registration should be checked and adjusted as necessary, either by shifting and/or rotating stage 28 or shifting and/or rotating the radiation pattern applied by optical subassembly 22. For this purpose, the 2D patterns applied by optical subassembly 22 can include registration marks, for example, and an automated optical inspection module (not shown) can capture and process images of stack 30 in order to compute any needed shift and rotation corrections. Alternatively, other measurement and position compensation techniques may be used for this purpose, such as the techniques described in U.S. Pat. No. 7,508,515, whose disclosure is incorporated herein by reference. Similar inspection and registration facilities can also be incorporated in unit 52, printing sub-system 54 and module 56 as needed.

When a functional component is to be inserted in or on the current layer 24, handling subsystem 58 transfers stack 30 to component placement unit 52, at an insertion step 72. Component placement unit 52 then picks and places the required components onto stack 30 at the appropriate locations.

Figure 7A:
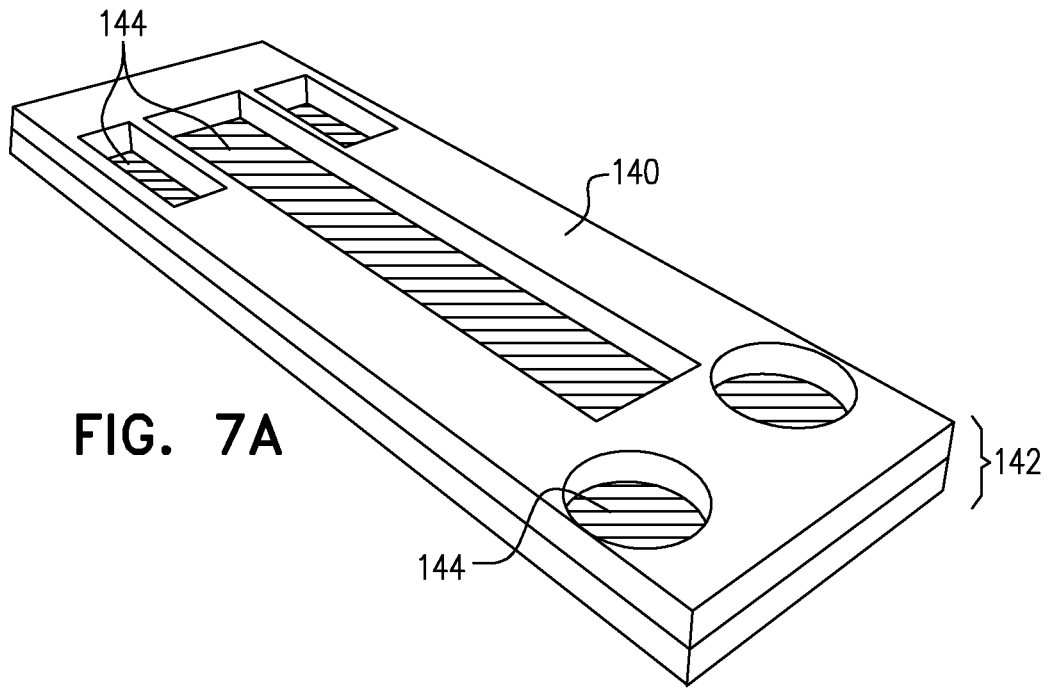
FIG. 7A is a schematic pictorial view of a layer of a laminated structure, showing cavities formed in the layer, in accordance with an embodiment of the invention.

In other cases, component placement station 52 places a pre-treated layer on stack 30, at step 72. This layer may also be made from PS-DF material, but is processed in advance to pre-form one or more cavities in the layer, by exposing and then developing the appropriate 2D pattern. Alternatively, the layer inserted at step 72 may comprise a different material, which has been molded and/or machined to the proper shape. (The cavities in such layers, whether made from PS-DF or other materials, can be used for insertion of functional components, as shown in FIGS. 7A/B, for example.) The registration techniques described above can similarly be used at step 72 in order to align the pre-treated layer with the underlying stack. Station 20 then laminates the pre-treated layer onto stack 30 in the manner described above, at step 66.

When traces or other structures are to be printed on the current layer, handling subsystem 58 transfers stack 30 to printing sub-system 54, at a laser processing step 74. Printing sub-system 54 applies LIFT printing, as described above, to print metal and other materials on the upper layer 24 of the current stack 30. When functional electronic components were placed on or in the current layer at step 72, the conductive traces printed by printing sub-system 54 can extend over both the dielectric material of layer 24 and the contacts of the electronic components, thus creating electrical connections on the dielectric material without pre-patterning of the traces. Techniques that can be used for this purpose are described, for example, in U.S. Provisional Patent Application 62/510,286, filed May 24, 2017, whose disclosure is incorporated herein by reference.

As described in U.S. Provisional Patent Application 62/510,286, as well as in the above-mentioned PCT publications, LIFT printing of conductive traces involves ejection of droplets of molten metal from a donor substrate onto upper layer 24 of stack 30. In some cases, the high-energy molten droplets tend to bounce and scatter off the surface of the film. Therefore, in some cases, printing sub-system 54 (or another station in system 50) treats current layer 24 prior to LIFT printing in order to enhance adhesion of the metal droplets to the surface of layer 24. For example, printing sub-system 54 may first LIFT-print a thin adhesion layer made from a metal, such as tin or a tin alloy, with a low melting temperature, as described in the above-mentioned U.S. Provisional Patent Application 62/510,286. A structural metal, such as copper, with a higher melting temperature is then printed over the adhesion layer.

As another example (also described in U.S. Provisional Patent Application 62/510,286), the laser in printing sub-system 54 may be used to drill a pattern of small holes in the surface of upper layer 24 in order to enhance capture of the molten metal droplets. The inventors have found holes that are 5-10 μm wide and 3-5 μm deep to work well in this regard. Alternatively, a pattern of holes of this sort may be stamped into film 26, which is relatively soft, by a suitable mechanical template, such as a metal or hardened polymeric material having an array of protrusions on its surface corresponding to the hole locations. Whether laser drilling or a mechanical template is used, the entire surface of film 26 may be treated in this manner prior to LIFT printing, or the treatment may be limited to a predefined area of the surface onto which the metal droplets are to be ejected.

Alternatively, in some embodiments, the order or steps 72 and 74 is reversed. For example, printing sub-system 54 may first print traces or other patterns of conductive or non-conductive material (such as glue) onto the upper surface of the current layer 24, and unit 52 may then place one or more components onto the printed pattern. This approach may be used both to enhance adhesion of the components and to provide electrical and/or thermal contact to components that are placed over the printed pattern.

When traces, components or other structures are to be embedded into film 26, handling subsystem 58 transfers stack 30 to embedding module 56, at an embedding step 76. This step is described hereinbelow with reference to FIGS. 6A/B.

System 50 cycles through the above steps 62-76 until all layers 24 in the 3D structure have been patterned, laminated and finished in accordance with the 3D design. Handling subsystem 58 then passes finished stack 30 to post-exposure bake, development and hard baking terminal 60. The development process depends on the type of PS-DF material that is used in patterning and lamination station 20. For epoxy-based DF-PR materials, for example, terminal first performs a post-exposure bake to harden the photoresist material in layers 24 before chemical development, at a post-exposure baking step 78. This step generally involves baking stack 30 at a temperature of 60-80° C. Alternatively, other sorts of DF-PR materials may not require a post-exposure bake.

Next, stack 30 is chemically developed to remove the parts of film 26 in which the desired pattern has not been created, at a development step 80. At this step, the sequence of latent 2D patterns that were exposed at step are turned into the corresponding 3D structure by immersing stack 30 in a suitable development solution. Any cavities within the 2D patterns used at step 64 are designed to have openings to the outside of the 3D structure in order to permit removal of the film material inside the cavities. Alternatively, when such openings are not available, layers with pre-formed cavities may have been incorporated at step 68.

When development is complete, the 3D structure is baked at a higher temperature in order to complete the curing and hardening of the polymer film material, at a hard baking step 82. This step typically involves temperatures of 150° C. or higher, depending on the type of material or combination of materials. The inventors have found that this high-temperature treatment is also beneficial in annealing metal traces printed at step 74, and thus increasing the conductivity of the traces. At this point, fabrication is complete.

Enhancing Resolution of Patterning

The spatial resolution of patterns printed on film 26 by optical patterning assembly 22 (FIG. 1) is limited by the inherent resolution of assembly 22 itself. This resolution is a function, inter alia, of the pitch of SLM (for example, a minimum of 5-10 µm for DMDs that are currently commercially available) and the magnification of optics 36. Finer resolution can be achieved, for example, by setting optics 36 for smaller magnification, but this enhanced resolution typically comes at the expense of reduced throughput of station 20. Variable resolution can be achieved using optics 36 with multiple magnification settings or possibly including two (or more) patterning subsystems in assembly 22—one for coarse resolution and another for fine resolution.

Figure 4A:
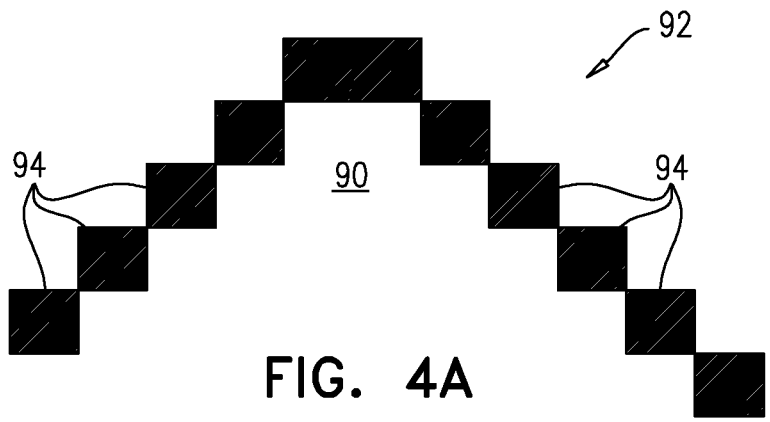
FIGS. 4A-4C are schematic top views of a substrate, showing successive stages in the creation of a layer of a 3D structure, in accordance with an embodiment of the invention.
Figure 4B:
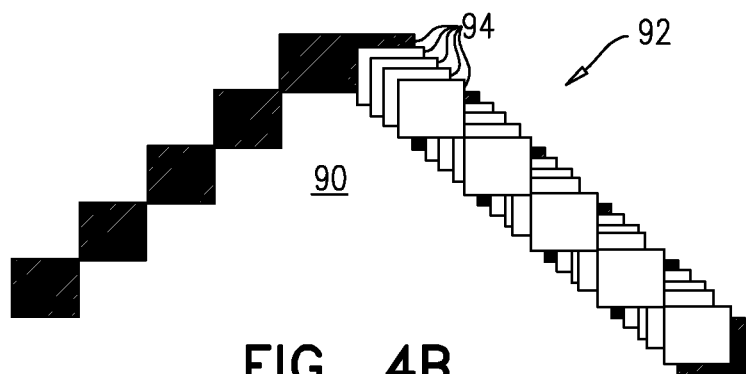
Figure 4C:
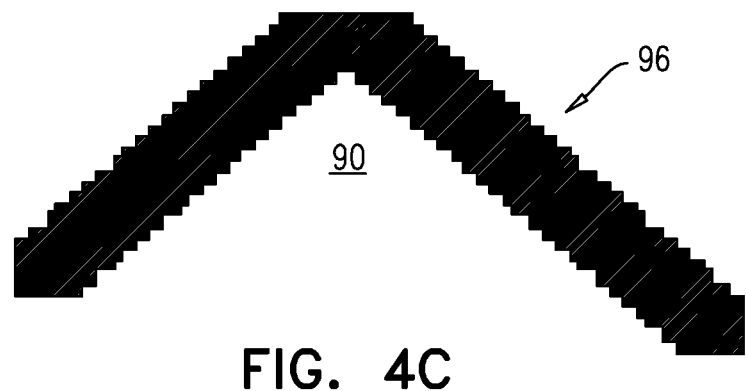

FIGS. 4A-4C are schematic top views of a substrate 90, showing successive stages in the creation of a layer of a 3D structure and demonstrating another approach to resolution enhancement in station 20, in accordance with an embodiment of the invention. This embodiment takes advantage of the insensitivity of the PS-DF-based techniques described above to overexposure in order to achieve finer pattern resolution than can be provided by the inherent spatial modulation period of SLM 34 (FIG. 1), by irradiating film 26 at many overlapping spots. (As noted above, however, extreme overexposure should be avoided.)

FIG. 4A shows a pattern 92 that is created on substrate 90 using SLM 34 at its inherent resolution. Each spot 94 in pattern 92 corresponds to the area of film 26 that is exposed by radiation reflected from a single micro-mirror of the DMD. Pattern 92 thus has a characteristic, stair-step pixelated shape.

FIG. 4B shows pattern 92 at a subsequent stage, in which the right arm of the pattern has been smoothed by overlapping multiple spots 94. Each set of overlapping spots is created by applying a small relative shift, on the order of 1-2 µm in the present example, between SLM 34 and film 26 that is finer than the resolution of the SLM. The shift may be applied either by moving film 26 or moving patterning assembly 22 or moving certain elements of the patterning assembly, such as SLM 34 or optics 36. Patterning assembly 22 irradiates each of spots 94 with sufficient energy to fully expose film 26, and therefore, most areas within pattern 92 are exposed to an energy flux that is at least twice the threshold flux that is needed to expose the photosensitive material through its entire thickness. As noted earlier, however, this overexposure, when applied within reasonable limits, has no effect on underlying layers 24 in stack 30.

FIG. 4C shows a final pattern 96 that is created in this fashion. Although the minimum line width of the pattern is limited by the resolution of optical patterning assembly 22, the edges of the pattern are smooth, in contrast to the pixelated pattern 92 shown in FIG. 4A. These techniques may similarly be used to create other smooth shapes, such as shapes with rounded edges.

The description above and the embodiment of FIGS. 4A-4C relate specifically to transverse resolution, i.e., resolution in the plane of film 26. The longitudinal resolution that can be achieved by patterning and lamination station 20, i.e., depth resolution, in the direction perpendicular to layers 24, depends on the thickness of film 26. The thinnest commercially-available PS-DFs at present are photosensitive polyimide films, with thickness down to 5 µm (available, for example, from Engineered Materials Systems, Inc., Delaware, Ohio). When finer resolution is needed in individual layers, other techniques can be used, such as pre-forming layers from other materials, LIFT printing of layers, or even integration of liquid-phase printing into the process of FIGS. 2 and 3.

Embedding of Metal Traces and Interconnects

To achieve good mechanical and electrical Integrity in stack 30, it can be important that metal traces and other structures that are printed at step 74 be embedded into the layers 24 of PS-DF material. These metal traces and structures provide electrical connectivity between components in a given layer 24, as well as between different layers. Additionally or alternatively, the metal traces and structures can serve as heat sinks and/or structural elements, to enhance the thermal and mechanical properties of the end-product.

In some embodiments (not shown in the figures) connections between layers 24 are made by incorporating pre-treated layers (steps 68-70 in FIG. 3) with pre-formed vias. The location of each such via is aligned with the location of a conductive pad in an underlying layer of stack 30. After lamination of the pre-treated layer over the underlying layer, the vias are filled with metal, for example by LIFT printing into the vias at step 74, or by other methods of deposition that are known in the art. Metal traces can also be printed over the upper surface of the pre-treated layer to make connections to the vias.

Similar techniques can be used to create heat sinks extending through vias in stack 30. In such cases the vias are filled with heat-conducting material and may connect to one or more layers of material with high heat conductivity that are added inside stack 30 or, particularly, at the top or bottom of the stack. (An example of such a structure shown in FIG. 8 and described hereinbelow with reference thereto.) Such heat-conducting layers may be produced, for example, by LIFT printing of a suitable metal or other heat-conducting material over the entire surface of an underlying PS-DF layer. Alternatively, the heat-conducting layer may be pre-formed before addition to stack 30. The heat-conducting vias that extend between layers may be formed by filling holes in pre-treated layers, as described above, or by laminating PS-DF layers over columns or heat-conducting material, particularly conical columns as will be described below.

As an alternative possibility in this regard, a pre-formed stack of two or more layers may be produced and then laminated onto a stack of undeveloped layers in the same manner as a single pre-formed layer (at steps 72 and 66 in FIG. 3). For this purpose, several layers are each exposed and laminated together, as at steps 64 and 66, and these layers are then developed to serve as a single, complex pre-formed insert at step 72. This approach is particularly useful in embedding circuits in a layer that contains pillars protruding from lower layers, in which case the use of pressure and heat, as described below, could break the pillars.

In some embodiments, conductive connections within and between layers can be produced without necessarily relying on pre-treated layers. These embodiments take advantage of the fact that prior to development and baking or stack 30 in steps 78-82 (FIG. 3), layers 24 of PS-DF material in stack 30 are relatively soft in comparison with the metal structures printed at step 74. As noted above, this difference in hardness makes it possible to embed the structures into the PS-DF layers by application of heat and pressure in embedding module 56, at step 76. Some examples of this functionality are described with reference to the figures that follow.

Figure 5A:
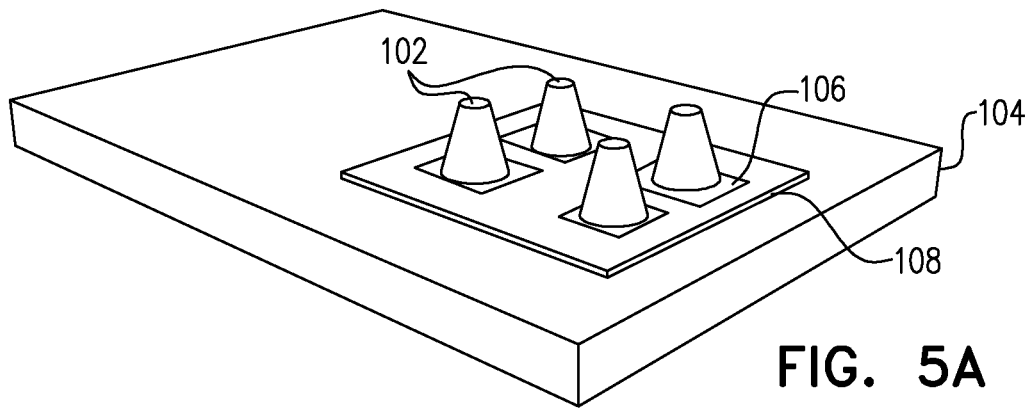
FIG. 5A is a schematic pictorial view of layer of a 3D structure on which conical vias have been formed, in accordance with an embodiment of the invention.
Figure 5B:
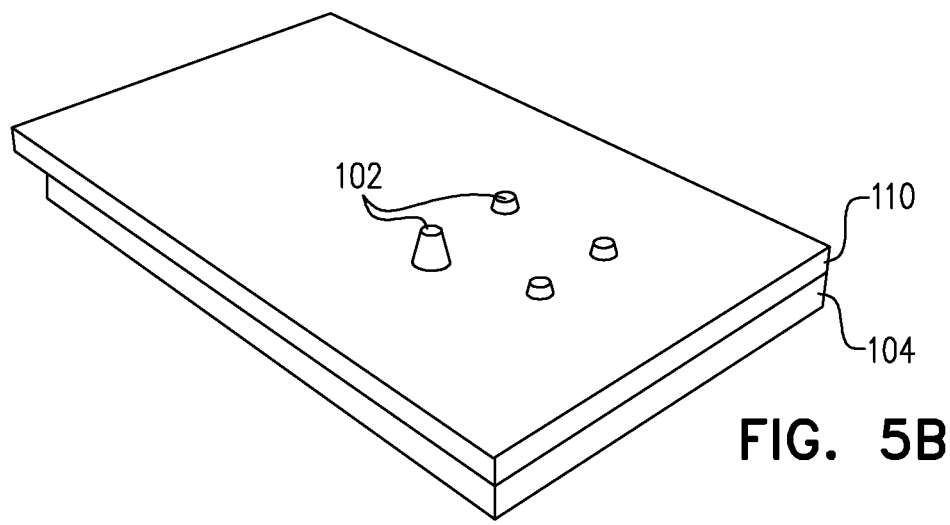
FIG. 5B is a schematic pictorial view of the 3D structure of FIG. 5A, following lamination of an additional layer of the structure over the conical vias, in accordance with an embodiment of the invention.
Figure 5C:
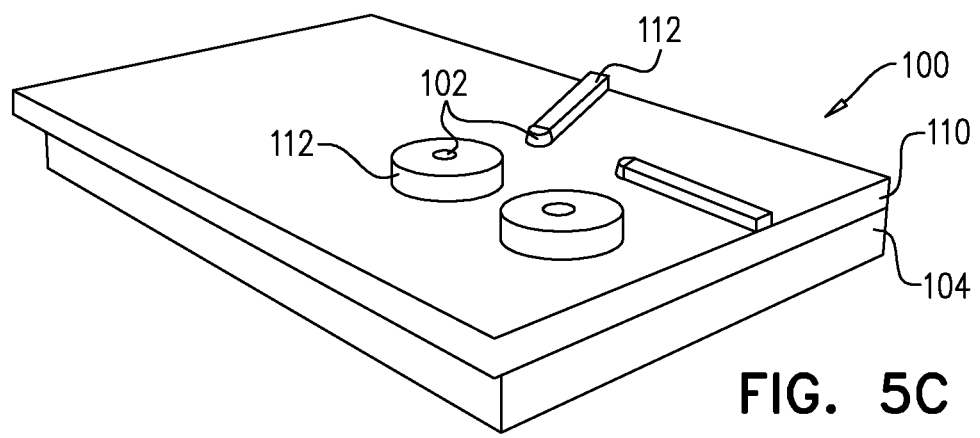
FIG. 5C is a schematic pictorial view of conductive elements connecting to the vias on the upper surface of the additional layer of FIG. 5B, in accordance with an embodiment of the invention.

FIGS. 5A-5C are schematic pictorial views showing successive stages in the formation of a 3D structure 100 containing conical vias 102, in accordance with an embodiment of the invention. The vias are conical in the sense that their base diameters are substantially larger than their top-end diameters, as illustrated particularly in FIG. 5A. In some cases, the inventors have used vias with base diameters at least twice the top-end diameters, but alternatively, the sides or the vias may be more steeply sloped. For example, in experimental evaluations of the present technique, the inventors found that conical vias with base diameters of 75-150 µm and top-end diameters of 25-50 µm could be produced readily using LIFT and gave good results in interlayer connections. In other applications, vias with sharp top ends (diameter less than 25 µm) are advantageous.

FIG. 5A is a schematic pictorial view of a layer 104 of 3D structure 100 on which conical vias 102 have been formed. Printing sub-system 54 (FIG. 2) has printed vias 102 on layer 104 as conical pillars, extending away from the surface of layer 104, for example by LIFT printing of the pillars at step 74. Typically, these pillars are printed together with other conductive interconnects, such as pads 106 below vias 102. In some cases, vias 102 are printed by LIFT over contacts of an electronic component 108.

FIG. 5B shows the next stage in the production of 3D structure 100, following lamination of an additional layer 110 of structure 100 over conical vias 102. Layer 110 is made by applying patterned electromagnetic energy to film 26 to expose the desired pattern in layer 110, at step 64, and then heating (for example, using infrared lamp 46, as shown in FIG. 1) and applying pressure over layer 110, at step 66 or step 76, so as to laminate layer 110 onto layer 104. After lamination, the tops of conical vias 102 protrude through layer 110. The relative softness of layer 110 at this stage and the conical shape of vias 102 enables the top ends of the conical pillars to penetrate through layer 110 without damaging the underlying layer 104. The heat applied to layer 110 at this step softens the layer further and thus facilitates penetration of the vias. In this case, there is no need to pre-drill or otherwise pre-form openings for the vias in layer 110.

FIG. 5C shows 3D structure 100 at the next stage in production, following the formation of conductive elements 112 connecting to vias 102 on the upper surface of layer 110. Conductive elements 112 are written on the surface of layer 110, for example by LIFT, at step 74, after lamination of layer 110, and make electrical connections to the tops of the conical pillars that protrude through the layer.

Figure 6A:
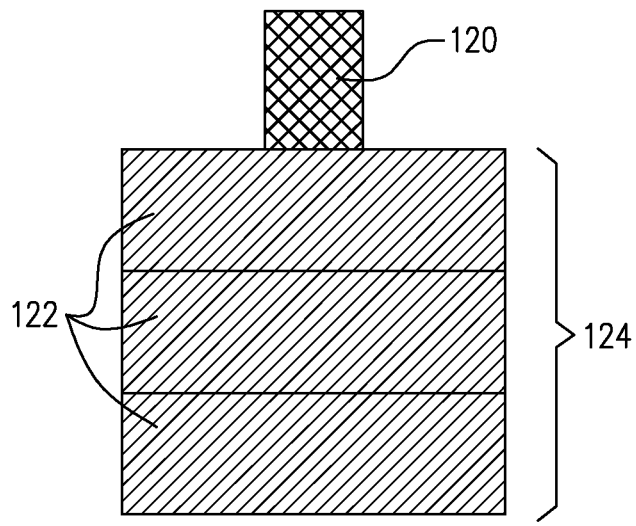
FIG. 6A is a schematic sectional view of a conductive trace formed on the upper surface of a laminated structure, in accordance with an embodiment of the invention.
Figure 6B:
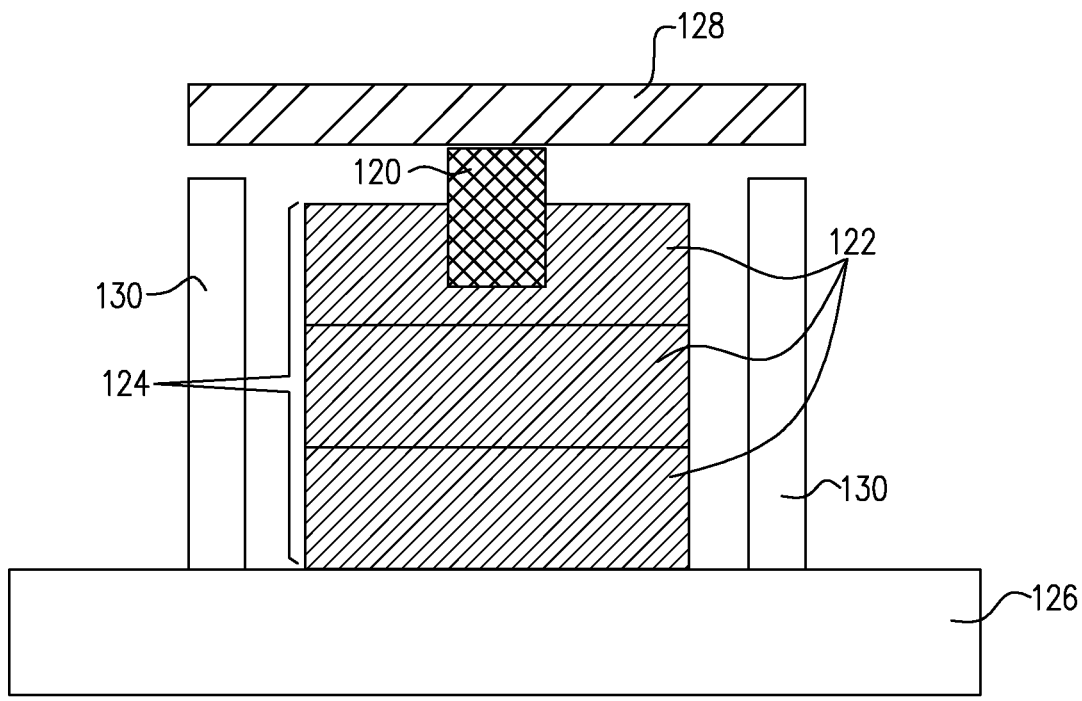
FIG. 6B is a schematic sectional view of the structure of FIG. 6A, illustrating a process of embedding the conductive trace into the structure, in accordance with an embodiment of the invention.

FIGS. 6A and 6B schematically illustrate the operation of embedding module 56 (FIG. 2) in embedding conductive traces into PS-DF layers 122 of a laminated 3D structure, in accordance with an embodiment of the invention. FIG. 6A is a schematic sectional view showing trace 120 formed on the upper surface of the top layer 122 of a 3D stack 124. Layers 122 have been patterned and then laminated together in station 20 (FIG. 1) to form stack 124, in the manner described above. Trace 120 was then printed in printing sub-system 54, for example by LIFT printing of a suitable metal.

FIG. 65 is a schematic sectional view illustrating the process of embedding conductive trace 120 into stack 124 in module 56. Alternatively, station may embed other elements, such as electronic or magnetic components placed by unit 52 at step 72, for example, into layers 122 using a similar process. As shown in FIG. 65, a heater 126 heats stack 124 (or at least the upper layer or layers 122 of the stack) sufficiently to soften the upper layer, typically to a temperature in the range of 50-90° C. Alternatively or additionally, a press 128 that is used in applying pressure to trace 120 can incorporate a heater, as well. For this purpose, heater 126 may comprise, for example, a hot plate as illustrated in the figure or, alternatively or additionally, press 128 may contain an infrared lamp or any other sort of controlled heater that is known in the art.

Simultaneously with heating layers 122, press 128 applies pressure to trace 120 so as to embed the trace into the dry film of the upper layer. The inventors found that a pressure in the range of 2-3 bars was sufficient for embedding narrow metal traces under these conditions, but other pressure settings may alternatively be used depending on factors such as the dimensions of the structures to be embedded and the type of PS-DF material and temperature in the upper layer 122. Stiff spacers 130 may be placed alongside stack 124 to ensure that press 128 does not excessively distort the shape of the 3D structure. The combination of heat and pressure conditions that are described above enables traces to be embedded and overlying layers to be laminated in atmospheric conditions (not requiring a vacuum), without leaving voids or bubbles between the elements of the 3D structure.

After embedding trace 120 into stack 124, additional layers may be patterned and laminated over the trace so as to produce a multi-layer stack containing the trace inside. The stack is then developed to form the final 3D structure, as described above.

The process described above is useful particularly in embedding metal traces and other components that are relatively shallow into stack 124. When larger components are to be embedded in a 3D structure, it can be advantageous to use pre-formed layers, as described below.

Embedding Components in 3D Structures

FIG. 7A is a schematic pictorial view of a layer 140 of a laminated structure 142, showing cavities 144 formed in the layer, in accordance with an embodiment of the invention. Cavities 144 are pre-formed in layer 140, which is then inserted at step 68 (FIG. 3) at the top of the stack of layers in structure 142, in which patterns will generally have been exposed but not yet developed. Layer 140 is then laminated onto the stack at step 70. Layer 140 may comprise the same sort of PS-DF material as the other layers in structure 142, but is patterned and developed off-line (as at step 80) in advance of incorporation in the stack. It is advantageous, in terms of mechanical and thermal compatibility, that layer 140 be made of a PS-DF material, and furthermore, that layer 140 not be hard-baked prior to step 68, but rather undergo hard-baking together with the other layers in structure 142 at step 82.

Alternatively, however, layer 140 may comprise other sorts of materials and be patterned by other processes, such as molding or machining, as long as these materials are capable of being laminated into structure 142. For example, layer 140 may comprise a thin metal sheet, in which cavities 144 are drilled, milled, or punched. Alternatively, layer 140 may comprise a suitable ceramic or (non-photosensitive) plastic material. Layer 140 may be of the same thickness as the PS-DF layers in structure 142, or may be either thicker or thinner.

Figure 7B:
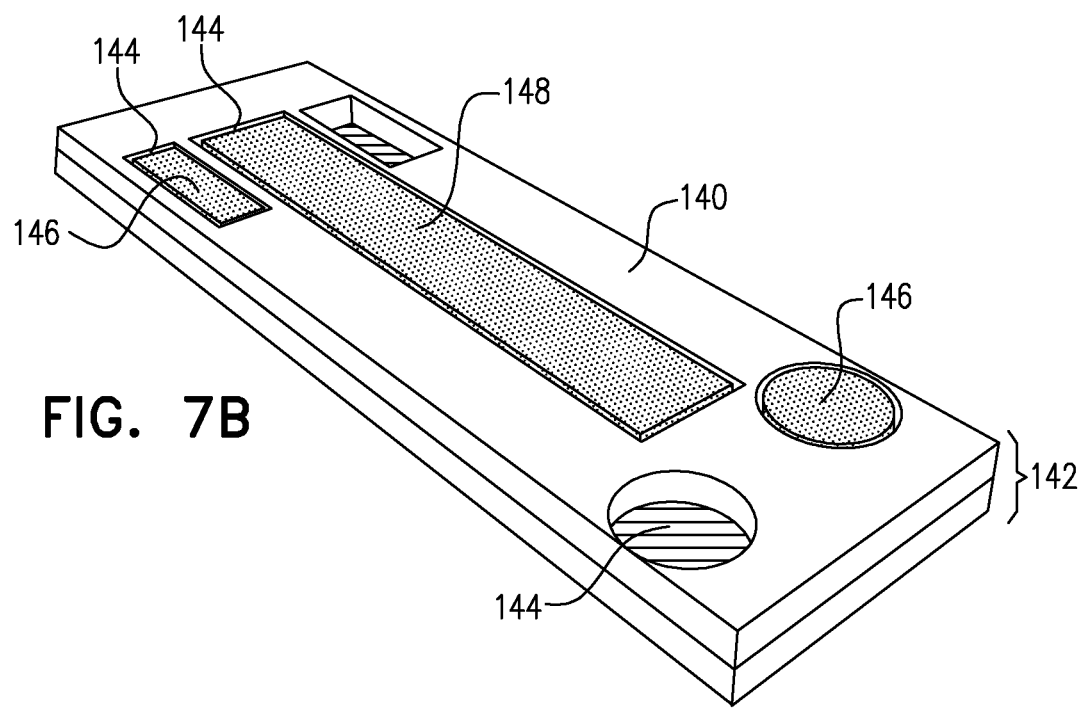
FIG. 7B is a schematic pictorial view of the layer shown in FIG. 7A, illustrating placement of other components in the cavities, in accordance with an embodiment of the invention.

FIG. 7B is a schematic pictorial view of layer 140, illustrating placement of components 146, 148 in cavities 144, in accordance with an embodiment of the invention. Components 146 in this example comprise another material, which is different from the material from which layer 142 is made. For example, components 146 may comprise metal or other conductive materials, or materials having different mechanical or optical properties as required by the design of the 3D device into which layer 142 is incorporated. Such components may be created by printing sub-system 54 (FIG. 1) or by other suitable means.

Component 148 comprises a functional component, such as an optoelectronic or MEMS component, or an integrated circuit die or passive component, or even a multi-chip hybrid device. Component 148 is typically placed in cavity 144, after lamination of layer 142, by component placement unit 52. The size of the cavity can be chosen to hold components 148 tightly. Alternatively or additionally, adhesive can be printed in the cavities, for example by LIFT, to hold component 148 in place. (Strong adhesion is also facilitated by the next laminate layer, which is tightly pressed over the top of the component.)

Figure 8:
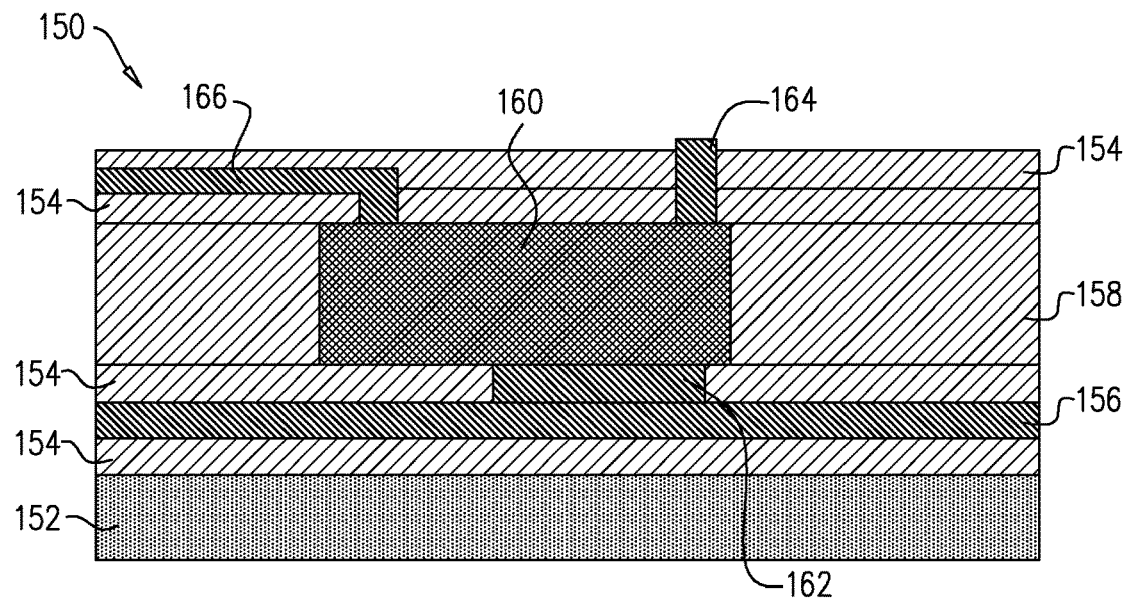
FIG. 8 is a schematic sectional view of a laminated 3D structure, in accordance with an embodiment of the invention.

FIG. 8 is a schematic sectional view of a laminated 3D structure 150, produced using the techniques described above, in accordance with an embodiment of the invention. Structure 150 comprises PS-DF layers 154, which are built up and laminated over a base layer 152. A thermal layer 156, such as a heat-conducting metal or ceramic, is laminated in between two PS-DF layers 154, followed by a pre-formed layer 158, with a cavity that contains an electronic component 160. Layer 158 is made substantially thicker than layers 154 in order to accommodate the full thickness of component 160 (although alternatively, multiple thinner layers, all with cavities pre-formed in the appropriate location, could be stacked up for this purpose). A thermal via 162 passing through one of PS-DF layers 154 connects component 160 to thermal layer 156.

Conductive vias 164 and circuit traces 166 connect to electrical terminals (not shown) on the upper side of component 160. Vias 164 may comprise conical pillars, which are printed onto the terminals of component 160 by printing sub-system 54 (FIG. 2), as described above, and then penetrate through overlying PS-DF layers 154 during lamination. Traces 166 are printed over one or more of PS-DF layers 154 and are then embedded into the layers by embedding module 56.

Incorporating Metal Structural Components in Laminated Assemblies

In some embodiments of the present invention, system 50 can be used to produce hybrid structures with controlled mechanical properties, by incorporating metal components into laminated dielectric layers, such as PS-DF layers. Metal components can be used, for example, to produce dielectric layers with specified mechanical properties that vary over the area of the layers. For example, the stiffness of a dielectric layer (as quantified by Young's modulus) can be varied over the area of the layer by printing a metal pattern having a transverse dimension that varies in accordance with the specified mechanical property.

Figure 9:
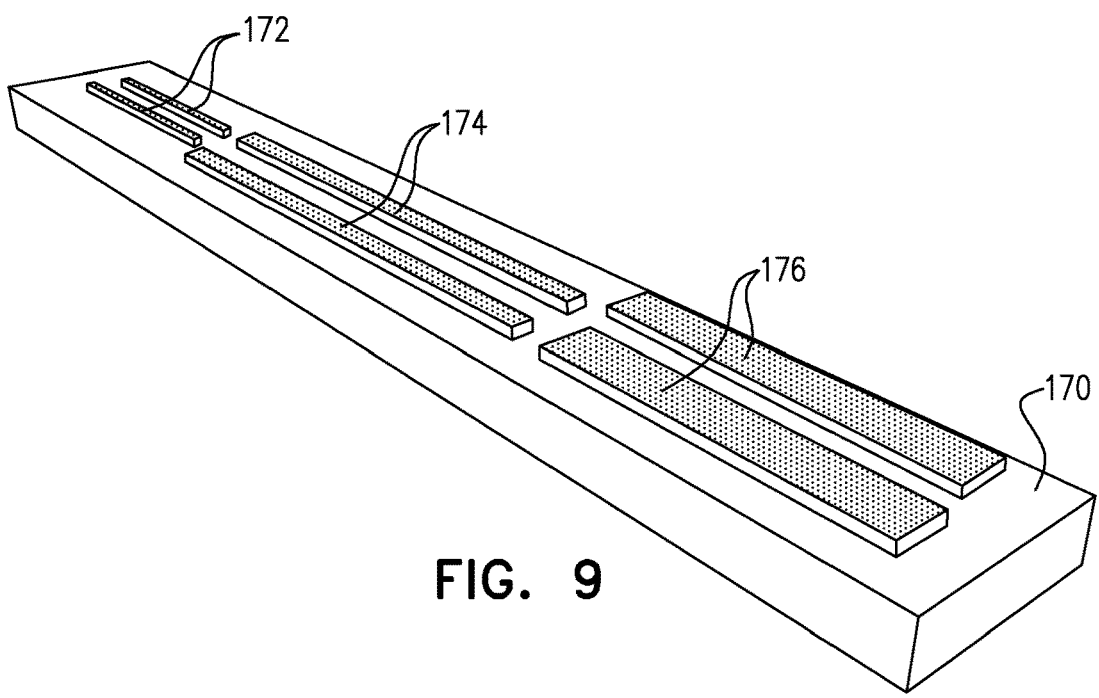
FIG. 9 is a schematic pictorial view of a layer of a dielectric material on which metal traces of varying widths have been formed, in accordance with an embodiment of the invention.

FIG. 9, for example, is a schematic pictorial view of a layer 170 of a dielectric material on which metal traces 172, 174, 176 of varying widths have been formed, in accordance with an embodiment of the invention. Layer 170 can be fabricated from a PS-DF or other dielectric material. Thin traces 172 are relatively flexible, while traces 174 and 176 are progressively wider and stiffer, thus modulating the stiffness of layer 170 along its length. Traces 172, 174, 176 can be printed, for example, by LIFT in printing sub-system 54 to meet the desired mechanical specifications, and may then be embedded into layer 170 in module 56 if appropriate. Further PS-OF layers (not shown in this figure) can be laminated over the traces on layer 170.

Alternatively or additionally, the mechanical properties of a PS-DF layer can be modulated by patterning of the layer itself, so that the density of the layer after development varies of the area of the layer.

System 50 (FIG. 2) can build up metal structures on PS-DF and other layers not only to support and strengthen the dielectric material, but also to serve as standalone elements, such as metal bridges and cantilevers. These metal elements can be used, for example, as mechanical components of micro-scale machines, as well as for improving mechanical strength and/or heat removal from 3D structures.

Figure 10:
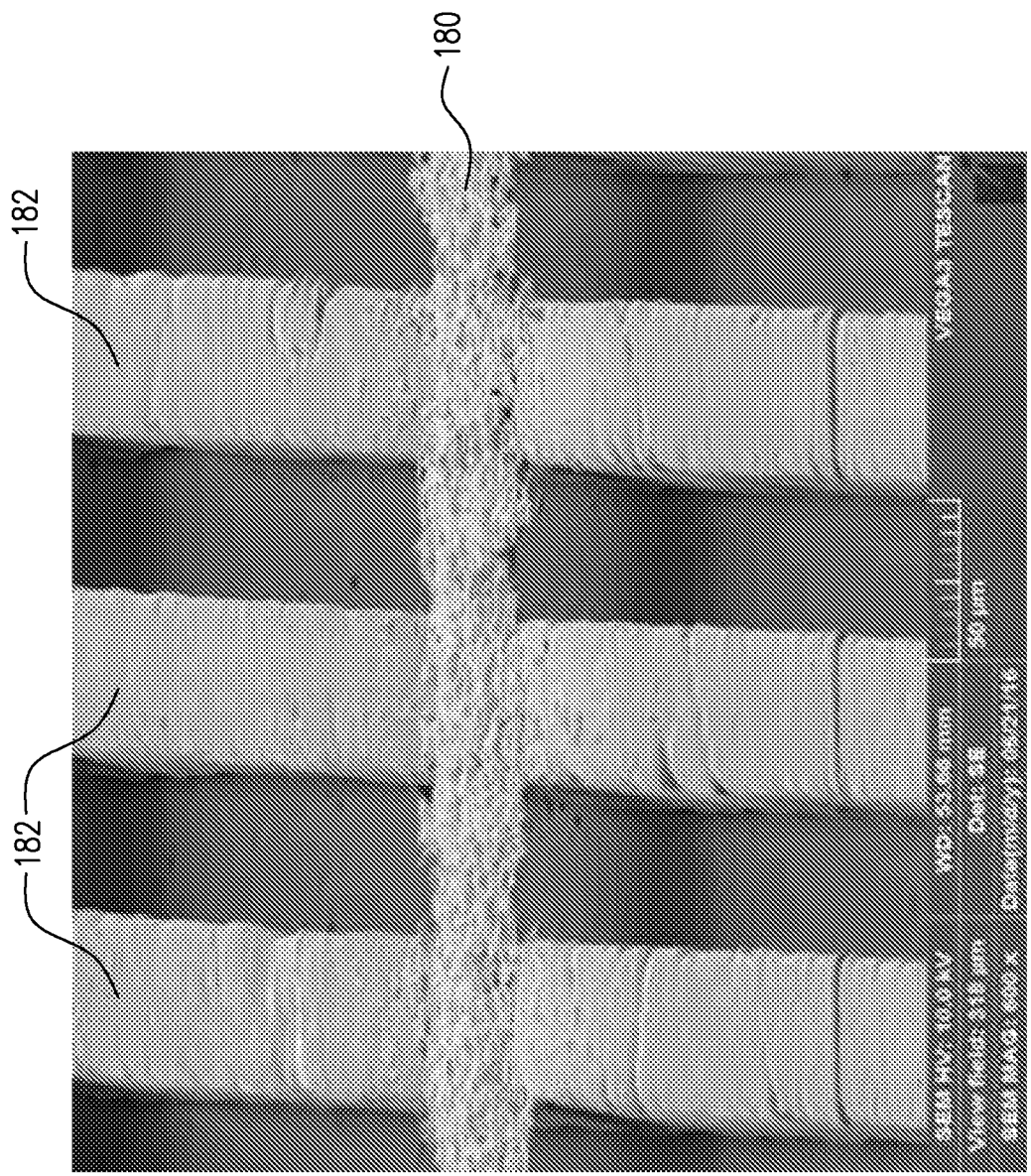
FIG. 10 is a photomicrograph illustrating a suspended metal structure formed in accordance with an embodiment of the invention.

FIG. 10 is a photomicrograph illustrating a suspended metal structure 180 of this sort, which is formed in accordance with an embodiment of the invention. Structure 180 bridges across open gaps between dielectric beams 182.

To produce structure 180, optical patterning assembly (FIG. 1) applies patterned radiation to film 26 so as to expose in the film a 2D pattern defining closed and open areas that will be formed when the film is developed. Printing sub-system 54 (FIG. 2) then prints a metal trace on film 26, such that the metal trace crosses the open areas of the pattern. Developing film 26 after printing the metal trace removes the film material from the open areas, leaving the metal trace to form structure 180 as a bridge over these open area, as shown in FIG. 10. In general, the chemicals used in development step 80 (FIG. 3) do not significantly corrode the metal trace, and the subsequent hard bake at step 82 anneals and strengthens structure 180.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A system for manufacturing, comprising:
   a patterning assembly that includes a light source, which is configured to apply patterned electromagnetic energy to a first side of each of a sequence of layers of a dry film comprising a photosensitive material so as to create in the photosensitive material in each of the layers a respective two-dimensional (2D) pattern corresponding to a slice of a predefined three-dimensional (3D) structure, wherein the patterning assembly is configured to apply the electromagnetic energy to selected target locations in each layer among at least some of the layers in the sequence with an energy flux at least twice a threshold flux that is needed to expose the photosensitive material through an entire thickness of the layer, wherein the patterning assembly is configured to irradiate the layer with the electromagnetic energy at a plurality of overlapping spots in the layer, and wherein the patterning assembly comprises a spatial light modulator having a given resolution, which modulates the patterned electromagnetic energy, and the patterning assembly is configured to apply a shift between the spatial light modulator and the layer that is finer than the given resolution in order to create the overlapping spots;

a lamination assembly, which is configured to laminate together the layers in the sequence in which the respective 2D pattern has been created to produce a multi-layer stack, wherein the lamination assembly includes a hot roller that exerts pressure on a second side of the dry film opposite of the first side;

a rotating stage disposed on an opposite side of the dry film from the lamination assembly; and a plurality of rollers disposed on the second side of the dry film, wherein the rollers and the hot roller contact the second side of the dry film in a same plane.

2. The system according to claim 1, wherein the patterning assembly is configured to pre-form a cavity in at least one layer, and wherein the lamination assembly is configured to laminate the at least one layer in the stack together with the layers in which the respective pattern has been created.

3. The system according to claim 2, and comprising a robot, which is configured to insert a functional component in the cavity, and a printing sub-system, which is configured to apply laser-induced forward transfer (LIFT) to eject droplets of an adhesive into the cavity prior to inserting the functional component.

4. The system according to claim 1, and comprising a printing sub-system, which is configured to form a conductive structure in or on at least one of the layers in the sequence before the layers are laminated together.

5. The system according to claim 4, wherein the printing sub-system is configured to apply laser-induced forward transfer (LIFT) to eject droplets of a metal onto a predefined area of the treated layer in order to form the conductive structure, and wherein the printing sub-system is configured to treat the at least one of the layers to enhance adhesion of the metal to the dry film prior to applying LIFT to eject the droplet, and to treat only the predefined area onto which the droplets are to be ejected.

6. The system according to claim 1, and comprising an embedding module, which is configured to embed a functional component in at least one of the layers in the sequence before the layers are laminated together.

* * * * *